United States Patent
Qian et al.

(10) Patent No.: US 8,023,920 B1
(45) Date of Patent: Sep. 20, 2011

(54) IMAGE CANCELLATION IN RECEIVERS

(75) Inventors: Haoli Qian, Sunnyvale, CA (US); Xiang Guang Feng, San Jose, CA (US); Runsheng He, Sunnyvale, CA (US); Zhipei Chi, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/718,909

(22) Filed: Mar. 5, 2010

Related U.S. Application Data

(63) Continuation of application No. 11/225,685, filed on Sep. 12, 2005, now Pat. No. 7,684,778.

(60) Provisional application No. 60/656,025, filed on Feb. 23, 2005, provisional application No. 60/665,477, filed on Mar. 25, 2005, provisional application No. 60/697,751, filed on Jul. 8, 2005.

(51) Int. Cl.
*H04B 1/10* (2006.01)
(52) U.S. Cl. .................. 455/302; 455/285
(58) Field of Classification Search .......... 455/296–312, 455/266, 254, 285
See application file for complete search history.

(56) References Cited

U.S. PATENT DOCUMENTS

| | | | | |
|---|---|---|---|---|
| 5,564,097 A * | 10/1996 | Swanke | ............... | 455/302 |
| 5,612,971 A * | 3/1997 | Dormer | ............... | 375/133 |
| 5,826,180 A * | 10/1998 | Golan | ............... | 455/302 |
| 6,516,186 B1 * | 2/2003 | Yamagishi et al. | ............... | 455/302 |
| 6,714,776 B1 * | 3/2004 | Birleson | ............... | 455/302 |
| 6,760,577 B2 | 7/2004 | Li | | |
| 6,876,842 B2 * | 4/2005 | Davie | ............... | 455/302 |
| 6,917,815 B2 * | 7/2005 | Hajimiri et al. | ............... | 455/552.1 |
| 6,980,787 B1 * | 12/2005 | Dujmenovic | ............... | 455/318 |
| 7,042,927 B2 * | 5/2006 | Wight | ............... | 375/147 |
| 7,130,359 B2 * | 10/2006 | Rahman | ............... | 375/316 |
| 7,142,835 B2 * | 11/2006 | Paulus | ............... | 455/302 |
| 7,146,146 B2 * | 12/2006 | Masenten et al. | ............... | 455/296 |
| 7,151,917 B2 * | 12/2006 | Paulus | ............... | 455/302 |
| 7,174,146 B2 * | 2/2007 | Wu et al. | ............... | 455/296 |
| 7,292,836 B2 * | 11/2007 | Endress et al. | ............... | 455/324 |
| 7,346,324 B2 * | 3/2008 | Sakurai | ............... | 455/285 |
| 7,684,778 B1 * | 3/2010 | Qian et al. | ............... | 455/302 |
| 2002/0177425 A1 * | 11/2002 | Li | ............... | 455/296 |
| 2002/0183033 A1 * | 12/2002 | Gu et al. | ............... | 455/302 |
| 2002/0197972 A1 * | 12/2002 | Wong et al. | ............... | 455/302 |
| 2003/0125005 A1 * | 7/2003 | Lee | ............... | 455/302 |
| 2003/0181187 A1 * | 9/2003 | Liu | ............... | 455/302 |

(Continued)

OTHER PUBLICATIONS

Van Sinderen et al.; "A 48-860MHz Digital Cable Tuner IC with Integrated RF and IF Selectivity"; ISSCC 2003/Session25/RF Infotainment/Paper 25.3.

(Continued)

*Primary Examiner* — Edward Urban
*Assistant Examiner* — RuiMeng Hu

(57) ABSTRACT

Systems and techniques relating to image cancellation in received communications signals are described. A described technique includes receiving a communications signal including a desired signal and an image signal; generating a leakage tracing signal at a frequency band of the image signal, the leakage tracing signal including a noise signal, a frequency of the leakage tracing signal being within the frequency band of the image signal; and removing the image signal from a signal that is based on the communications signal and the leakage tracing signal to resolve the desired signal, where the removing is based on an addition of the leakage tracing signal to the communications signal. Removing the image signal can include using one or more weights to control one or more filters to resolve the desired signal. The one or more weights can be determined based on the noise signal.

20 Claims, 10 Drawing Sheets

U.S. PATENT DOCUMENTS

| | | | |
|---|---|---|---|
| 2004/0002318 A1* | 1/2004 | Kerth et al. | 455/302 |
| 2004/0185815 A1* | 9/2004 | Fukuda et al. | 455/296 |
| 2004/0198299 A1* | 10/2004 | Gardenfors et al. | 455/333 |
| 2005/0096002 A1* | 5/2005 | Klinke et al. | 455/302 |
| 2006/0030287 A1* | 2/2006 | Vanderhelm et al. | 455/296 |
| 2006/0111071 A1* | 5/2006 | Paulus et al. | 455/302 |
| 2006/0252399 A1* | 11/2006 | Paulus | 455/302 |

OTHER PUBLICATIONS

Behzad Razavi; "A 5.2-GHz CMOS Receiver with 62-dB Image Rejection"; IEEE Journal of Solid-State Circuits, vol. 36, No. 5; pp. 810-815; May 2001.

Der et al.; "A 2-GHz CMOS Image-Reject Receiver with LMS Calibration"; IEEE Journal of Solid-State Circuits, vol. 38, No. 2; pp. 167-175; Feb. 2003.

Asad A. Abidi; "Direct-Conversion Radio Transceivers for Digital Communications"; IEEE Journal of Solid-State Circuits, vol. 30, No. 12; pp. 1399-1410; Dec. 1995.

Behbahani et al.; "CMOS Mixers and Polyphase Filters for Large Image Rejection"; IEEE Journal of Solid-State Circuits, vol. 36, No. 6; pp. 873-887; Jun. 2001.

Crols et al.; "A Single-Chip 900 MHz CMOS Receiver Front-End with a High Performance Low-IF Topology"; IEEE Journal of Solid-State Circuits, vol. 30, No. 12; pp. 1483-1492; Dec. 1995.

Dawkins et al.; "A Single-Chip tuner for DVB-T"; IEEE Journal of Solid-State Circuits, vol. 38, No. 8; pp. 1307-1317; Aug. 2003.

Rudell et al.; "A 1.9-GHz Wide-Band IF Double Conversion CMOS Receiver for Cordless Telephone Applications"; IEEE Journal of Solid-State Circuits, vol. 32, No. 12; pp. 2071-2088; Dec. 1997.

Valkama et al.; "Advanced Methods for I/Q Imbalance Compensation in Communication Receivers"; IEEE Transactions on Signal Processing, vol. 49, No. 10; pp. 2335-2344; Oct. 2001.

Van Gerven; "Signal Separation by Symmetric Adaptive Decorrelation: Stability, Convergence, and Uniqueness"; IEEE Transactions on Signal Processing, vol. 43, No. 7; pp. 1602-1612; Jul. 1995.

Yu et al.; "A Novel Adaptive Mismatch Cancellation System for Quadrature IF Radio Receivers": IEEE Transactions on Circuits and Systems-II: Analog and Digital Signal Processing, vol. 46, No. 6; pp. 789-801; Jun. 1999.

Jack P.F. Glas; "Digital I/Q Imbalance Compensation in a Low-IF Receiver"; Nov. 1998, Bell Labs, Lucent Technologies; Murray Hill, NJ.

* cited by examiner

IMAGE CANCELLATION IN RECEIVERS

CROSS-REFERENCE TO RELATED APPLICATIONS

This application is a continuation of and claims the benefit of the priority of U.S. application Ser. No. 11/225,685 filed Sep. 12, 2005, and entitled "Image Cancellation in Receivers", which claims the benefit of the priority of: (1) U.S. Provisional Application Ser. No. 60/656,025, filed Feb. 23, 2005, and entitled "Pilot Sequence-Based Image Cancellation for Broadband Tuner Design"; (2) U.S. Provisional Application Ser. No. 60/665,477, filed Mar. 25, 2005, and entitled "Pilot Sequence-Based Image Cancellation for Broadband Tuner Design"; and (3) U.S. Provisional Application Ser. No. 60/697,751, filed Jul. 8, 2005, and entitled "Pilot Sequence-Based Image Cancellation for Broadband Tuner Design".

BACKGROUND

This document relates to image cancellation in receivers.

Reception of a low-level radio-frequency (RF) signal often benefits from low noise and high precision operation. Noise and imprecision in such circuits have many different origins. Interference from another frequency band is a factor that can limit system performance.

One common undesired signal is an image frequency that is symmetrical to the signal frequency relative to the local oscillator frequency of a downconverter. Interference caused by the image frequency is referred to as image frequency interference. Image frequency interference can produce undesirable content in the eventual received signal, often called signal leakage or image leakage.

SUMMARY

According to an aspect of the described systems and techniques, a method includes receiving a communications signal including a desired signal and an image signal, generating a leakage tracing signal, and removing the image signal from the communications signal using the leakage tracing signal mixed with the communications signal. In some implementations, the receiving the communications signal includes receiving a first signal including the desired signal and a component of the image signal, and receiving a second signal including the image signal and a component of the desired signal. The removing the image signal can include subtracting a modified version of the second signal from the first signal.

In some implementations, the method includes filtering the second signal based on the leakage tracing signal and the first signal to generate the modified version of the second signal, and filtering the first signal based on the leakage tracing signal and the second signal to generate a modified version of the first signal. The subtracting can include subtracting the modified version of the second signal from the modified version of the first signal.

In some implementations of the method, the filtering of the second signal includes determining first least-mean-square update weights from the first signal and the leakage tracing signal, and adaptively filtering the second signal based on the first least-mean-square update weights. In some implementations, the filtering of the first signal includes determining second least-mean-square update weights from the second signal and the leakage tracing signal, and adaptively filtering the first signal based on the second least-mean-square update weights.

In some implementations, the method further includes filtering the second signal based on the leakage tracing signal and the first signal to generate the modified version of the second signal. In some implementations, the filtering of the second signal includes determining first least-mean-square update weights from the second signal and the leakage tracing signal, determining second least-mean-square update weights from the first signal and the first least-mean-square update weights, and programmably filtering the second signal based on the second least-mean-square update weights.

In some implementations, the receiving the communications signal includes receiving a radio-frequency (RF) signal. In some implementations, the method further includes mixing the leakage tracing signal with the RF signal, downconverting the RF signal to form a downconverted signal, and filtering the downconverted signal in both a signal channel and an image channel.

In some implementations, the downconverting includes downconverting the RF signal to form in-phase and quadrature signals, and the filtering the downconverted signal includes polyphase filtering the in-phase signal and the quadrature signal in the signal channel, and polyphase filtering the in-phase signal and an inverted version of the quadrature signal in the image channel.

In some implementations, the generating the leakage tracing signal includes generating a binary phase-shift keying (BPSK) modulated binary M-sequence, converting the BPSK modulated binary M-sequence to an analog signal, and upconverting the analog signal to a frequency band of the image signal.

In some implementations, the generating the leakage tracing signal includes digitally generating a pseudorandom noise signal.

According to an aspect of the described systems and techniques, a method includes receiving a communications signal that includes a desired signal and an image signal, generating a leakage tracing signal, and removing both the image and leakage tracing signal components from the communications signal using the leakage tracing signal mixed with the communications signal. The communications signal can be a radio-frequency (RF) signal and the leakage tracing signal can be a binary phase-shift keying (BPSK) modulated binary M-sequence.

In some implementations, the method includes generating a first channel signal and a second channel signal, generating a first filter using the first channel signal and the leakage tracing signal, and generating a second filter using the second channel signal and the leakage tracing signal. Removing the image signal from the communications signal includes filtering the first channel signal using the second filter to obtain a first filtered signal, filtering the second channel signal using the first filter to obtain a second filtered signal, and subtracting the second filtered signal from the first filtered signal.

In some implementations, generating the first channel signal and the second channel signal includes quadrature downconverting the communications signal. In other implementations, the first and second filters include adaptive filters, generating the first filter includes using a first least-mean-squared update, and generating the second filter includes using a second least-mean-squared update.

In some implementations, the leakage tracing signal can include a digitally generated broadband pseudorandom noise signal. In some implementations, generating the first channel signal includes using a first analog filter to suppress the image signal, and generating the second channel signal includes using a second analog filter to suppress the desired signal.

In some implementations, an apparatus includes an input configured to receive a communications signal including a desired signal and an image signal, and a device configured to generate a pseudorandom signal and to remove the image signal from the communications signal using the pseudorandom signal mixed with the communications signal. In some implementations, the input is configured to receive the communications signal including a radio-frequency (RF) signal, and the device is configured to generate the pseudorandom signal including a binary phase-shift keying (BPSK) modulated sequence.

In some implementations, the apparatus also includes a quadrature downconverter configured to generate a first channel signal and a second channel signal from the communications signal, and the device includes: (i) a first filter, generated from the first channel signal and the pseudorandom signal, that is configured to filter the second channel signal and to output a second filtered signal; (ii) a second filter, generated from the second channel signal and the pseudorandom signal, that is configured to filter the first channel signal and to output a first filtered signal; and (iii) an adder that is configured to subtract the second filtered signal from the first filtered signal.

In some implementations of the apparatus, the first and second filters include adaptive filters, the first filter includes a first least-mean-squared filter, and the second filter includes a second least-mean-squared filter. In some implementations, the apparatus also includes a first analog filter configured to suppress the image signal in the first channel signal and a second analog filter configured to suppress the desired signal in the second channel signal. In some implementations, the first and second analog filters include polyphase filters.

In some implementations, the apparatus includes a quadrature downconverter configured to generate a first channel signal and a second channel signal from the communications signal, and the device includes: (i) a second adaptive filter responsive to the pseudorandom signal and the second channel signal; (ii) a first adaptive filter responsive to the first channel signal and an output of the second adaptive filter; and (iii) a third filter responsive to the second channel signal and an output of the first adaptive filter. The apparatus can also include an adder configured to subtract an output of the third filter from the first channel signal.

In some implementations, the input is configured to receive the communications signal including a radio-frequency (RF) signal, and the input further includes a RF bandpass filter configured to filter the RF signal. In some implementations, the device further includes: a digital signal processor (DSP) configured to generate the pseudorandom signal, a signal channel polyphase filter and an image channel polyphase filter, and an upconverter configured to upconvert a version of the pseudorandom signal into an image band. The apparatus can further include a mixer configured to mix the version of the pseudorandom signal with the RF signal.

The described systems and techniques can result in one or more of the following advantages. Broadband image cancellation that compensates for image leakage caused by both mixer mismatches and component mismatches in analog filters and analog-to-digital converters (ADCs) can be targeted. Additional image cancellation capability provided by a digital signal processing (DSP) unit can reduce the component matching requirement in the analog circuit design for mixers and polyphase filters. Moreover, systems and apparatuses with guaranteed convergence to the optimum cancellation solution and numerical stability can be realized.

The described systems and techniques can be implemented in electronic circuitry, computer hardware, firmware, software, or in combinations of them, such as the structural means disclosed in this specification and structural equivalents thereof. This can include a software program operable to cause one or more machines (e.g., a signal processing device) to perform operations described. Thus, program implementations can be realized from a disclosed method, system, or apparatus, and apparatus implementations can be realized from a disclosed system, program, or method. Similarly, method implementations can be realized from a disclosed system, program, or apparatus, and system implementations can be realized from a disclosed method, program, or apparatus.

For example, the disclosed embodiment(s) below can be implemented in various systems and apparatus, including, but not limited to, a special purpose programmable machine (e.g., a wireless access point, a router, a switch, a remote environment monitor), a mobile data processing machine (e.g., a wireless client, a cellular telephone, a personal digital assistant (PDA), a mobile computer, a digital camera), a general purpose data processing machine (e.g., a minicomputer, a server, a mainframe, a supercomputer), or combinations of these.

In some implementations, an apparatus includes input means for receiving a communications signal including a desired signal and an image signal, and means for generating a pseudorandom signal and removing the image signal from the communications signal using the pseudorandom signal mixed with the communications signal. The input means can be means for receiving the communications signal including a radio-frequency (RF) signal. The means for generating can include means for generating the pseudorandom signal including a binary phase-shift keying (BPSK) modulated sequence.

In some implementations, the apparatus also includes quadrature downconverter means for generating a first channel signal and a second channel signal from the communications signal, and the means for generating and removing includes: (i) first means for filtering the second channel signal to output a second filtered signal, the first means for filtering being generated from the first channel signal and the pseudorandom signal; (ii) second means for filtering the first channel signal to output a first filtered signal, the second means for filtering being generated from the second channel signal and the pseudorandom signal; and (iii) adder means for subtracting the second filtered signal from the first filtered signal.

In some implementations of the apparatus, the first and second means for filtering include means for adaptive filtering, the first means for filtering includes means for performing least-mean-squared filtering, and the second means for filtering includes means for performing least-mean-squared filtering. In some implementations, the apparatus also includes first analog filter means for Customer No. 26200 suppressing the image signal in the first channel signal and second analog filter means for suppressing the desired signal in the second channel signal. In some implementations, the first and second means for filtering include means for polyphase filtering.

In some implementations, the apparatus includes a quadrature downconverter means for generating a first channel signal and a second channel signal from the communications signal, and the means for generating and removing includes: (i) second adaptive filter means for responding to the pseudorandom signal and the second channel signal; (ii) first adaptive filter means for responding to the first channel signal and an output of the second adaptive filter means; and (iii)

third filter means for responding to the second channel signal and an output of the first adaptive filter means. The apparatus can also include adder means for subtracting an output of the third filter means from the first channel signal.

In some implementations, the input means can be means for receiving the communications signal including a radio-frequency (RF) signal, and the input means further includes RF bandpass means for filtering the RF signal. In some implementations, the means for generating and removing further includes: digital signal processor (DSP) means for generating the pseudorandom signal, polyphase means for filtering a signal channel and polyphase means for filtering an image channel, and means for upconverting a version of the pseudorandom signal into an image band. The apparatus can further include means for mixing the version of the pseudorandom signal with the RF signal.

The details of one or more implementations are set forth in the accompanying drawings and the description below. Other features, objects and advantages may be apparent from the description and drawings, and from the claims.

DRAWING DESCRIPTIONS

Like reference symbols in the various drawings indicate like elements.

DETAILED DESCRIPTION

Figure 1:
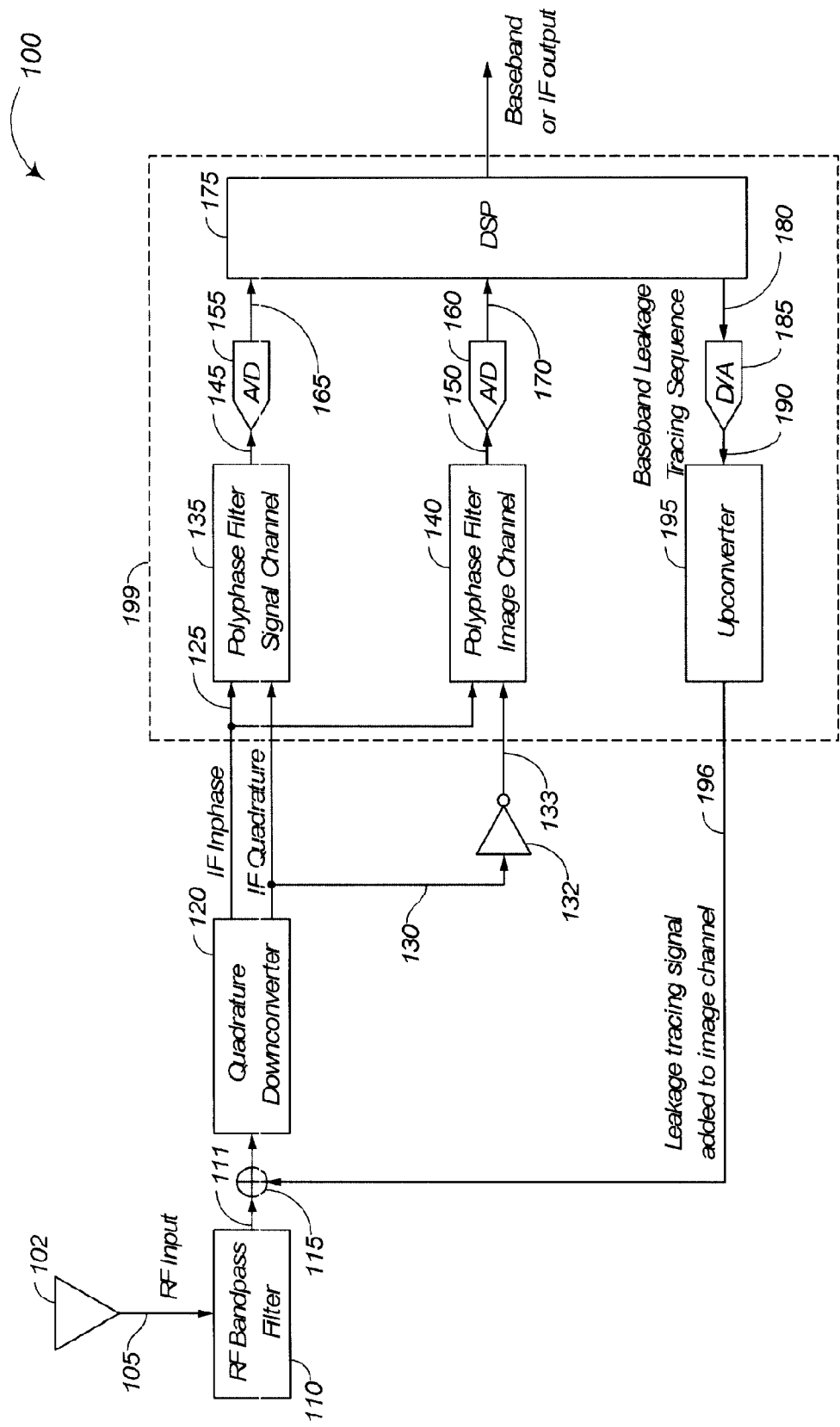
FIG. 1 is a block diagram of a receiver.
Figure 3A:
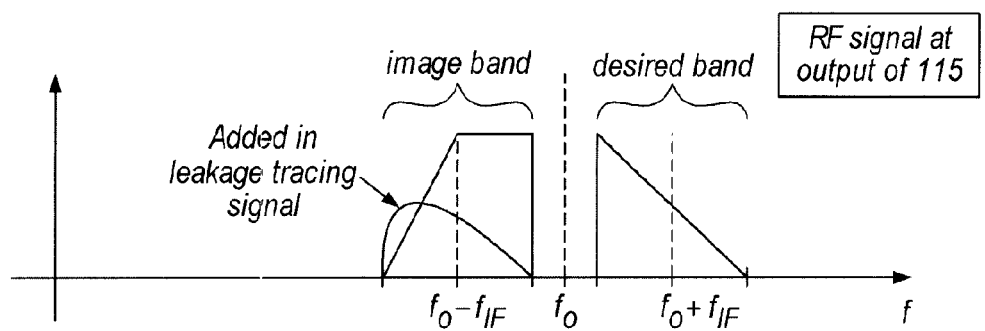
FIGS. 3A-3J are frequency domain representations of relevant signals in image cancellation.

FIG. 1 depicts a receiver configured to perform image cancellation, and FIGS. 3A-3E depict relevant signals in the frequency domain at various points in FIG. 1. An RF input signal 105 is received from one or more antennas 102 and passes through an RF bandpass filter 110. The RF input signal 105 includes signals at many frequency bands, including a desired signal band (containing a desired signal) and an image band (containing an interfering signal). The RF bandpass filter 110 can eliminate energy outside a wide band including the desired signal band to create a filtered RF input signal 111. A combiner 115 combines the filtered RF input signal 111 with a leakage tracing signal 196. FIG. 3A depicts this combined RF signal in the frequency domain.

The leakage tracing signal 196 can be generated by a digital signal processor (DSP) 175, which can generate a digital random sequence 180. The random sequence can be a pseudonoise sequence, e.g., a binary phase-shift keying (BPSK) modulated M-sequence. A digital-to-analog converter (DAC) 185 can convert the digital random sequence 180 into an analog baseband leakage tracing signal 190. An upconverter 195 can then convert the analog baseband signal 190 into leakage tracing signal 196 in the image band. In some implementations, this upconversion can be performed by DSP 175. In some implementations, signals or sequences may be referred to as leakage tracing, pilot, random, pseudorandom, and pseudonoise.

Combiner 115 inserts the leakage tracing signal 196 into the image band of the filtered RF input signal 111. The resulting signal can pass through a quadrature downconverter 120 to be downconverted into an in-phase signal 125 and a quadrature-phase signal 130 at an intermediate frequency (IF).

Figure 3B:
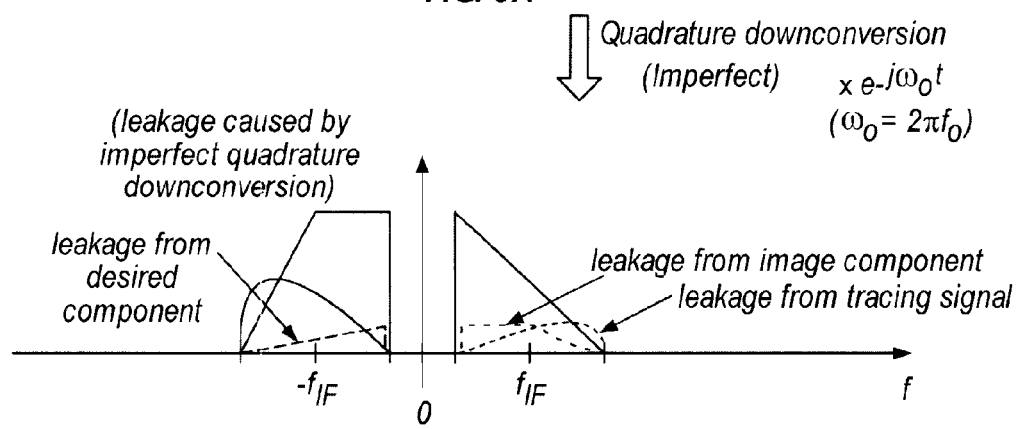
Figure 3C:
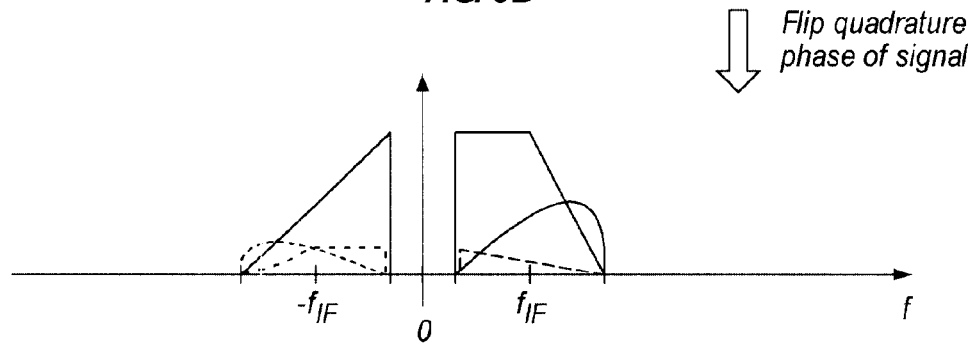
Figure 3D:
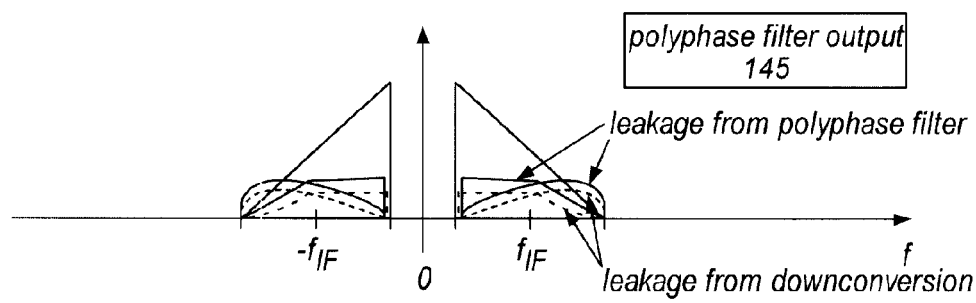

In-phase signal 125 and quadrature-phase signal 130 can be passed through signal channel polyphase filter 135 to filter out the image component in the downconverted image band. FIG. 3B depicts the signals entering signal channel polyphase filter 135. FIG. 3D is a frequency domain representation of the IF signal 145 at the output of signal channel polyphase filter 135.

Figure 3E:
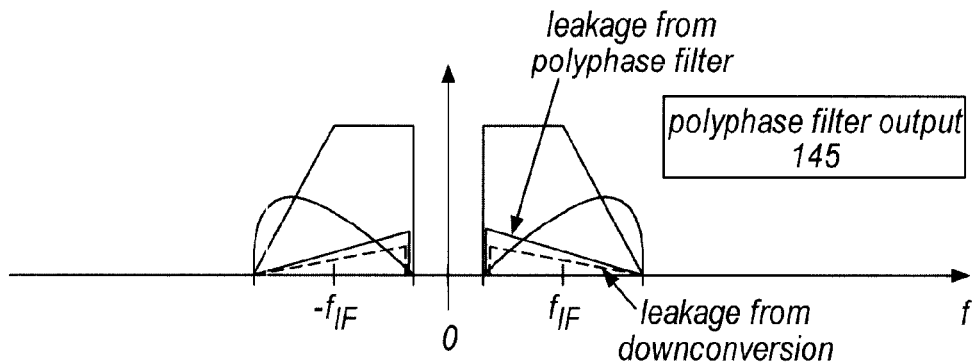

Quadrature-phase signal 130 can be passed through inverter 132 to obtain inverted quadrature-phase signal 133. In-phase signal 125 and inverted quadrature-phase signal 133 can be passed through image channel polyphase filter 140 to filter out the desired signal component in the downconverted signal band. Flipping the polarity of quadrature-phase signal 130 flips the polarity of the frequency bands of the complex IF signal (125, 133) and the output of the image channel polyphase filter is largely comprised of the components from the IF image band. FIG. 3C is a frequency domain representation of the signals entering image channel polyphase filter 140. FIG. 3E is a frequency domain representation of the IF signal 150 at the output of signal channel polyphase filter 140.

The polyphase filters can thus be used to filter out or suppress the negative frequency components. Although signal channel polyphase filter 135 and image channel polyphase filter 140 are depicted and described as being analog filters, in some implementations these filters can be realized wholly in the digital domain.

The resulting real IF signals 145 and 150 can be digitized by analog-to-digital converters (ADCs) 155 and 160. The digitized filtered signals from the signal channel 165 and image channel 170 can then be operated on by the digital signal processor (DSP) 175 to further resolve the desired signal. DSP 175 can be programmed to provide either a baseband signal or a IF signal.

In an implementation, a device 199 can include: signal channel polyphase filter 135; image channel polyphase filter 140; ADCs 155 and 160; DSP 175; DAC 185; inverter 132; and upconverter 195. In other implementations, the device 199 can include fewer of these components or the additional components shown in FIG. 1. Moreover, the device 199 can include additional components not shown in FIG. 1.

Figure 2:
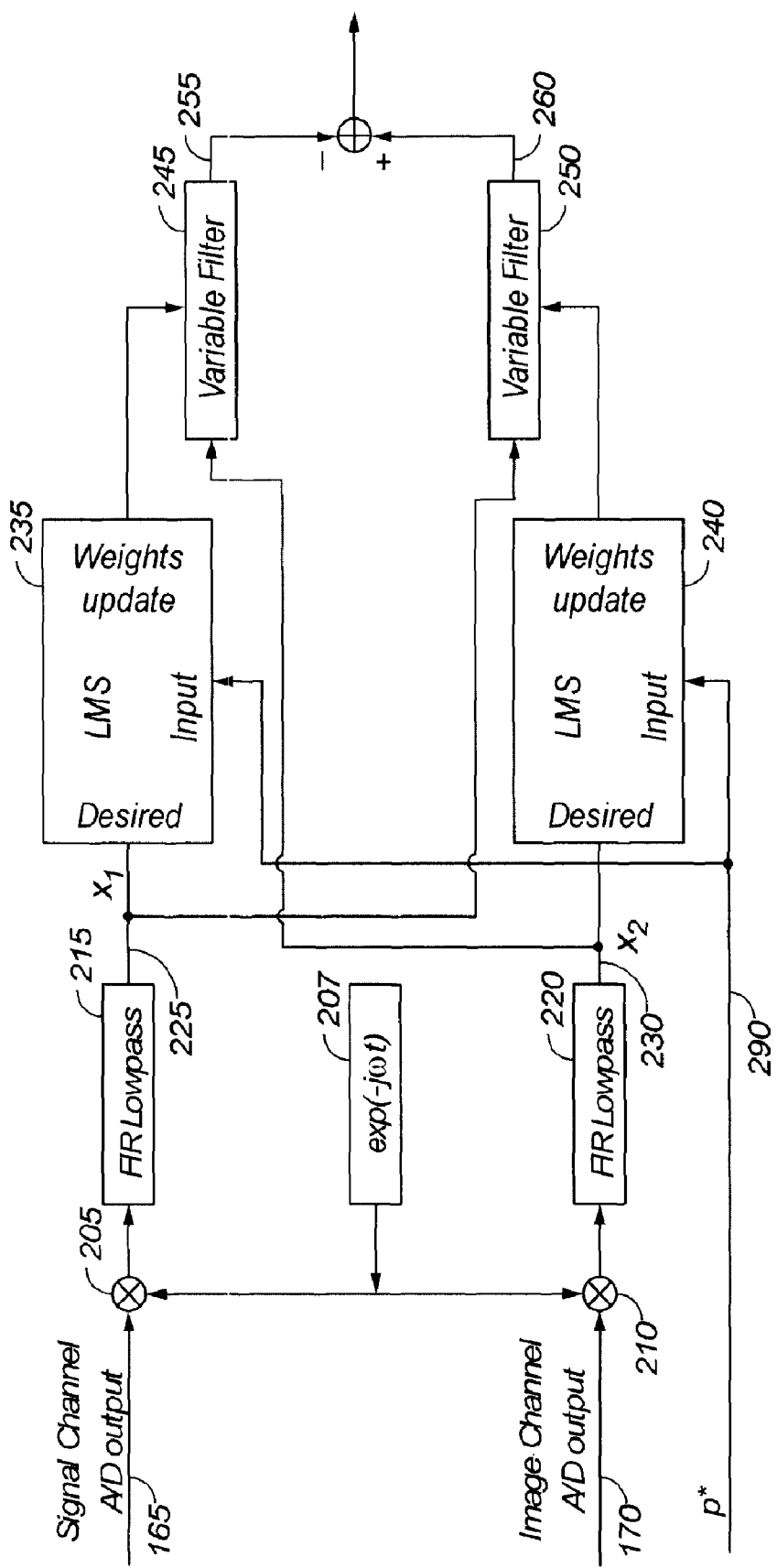
FIGS. 2 and 4 are block diagrams of a digital signal processor.

FIG. 2 depicts an implementation of image cancellation in a DSP (e.g., DSP 175), and FIGS. 3F-3J depict relevant signals in the frequency domain at various points in FIG. 2. The digitized filtered signals in the signal channel 165 and image channel 170 are downconverted to baseband by multiplying them by $\exp(-j0It)$ 207 at multipliers 205 and 210. (In some implementations, the signals need not be downconverted at all. Thus, the below-described filter adaptation and signal processing can also be implemented in IF band instead of baseband. The discussion below, however, focuses on the baseband point of view.)

The downconverted signals can be filtered through lowpass filters 215 and 220 (e.g., finite impulse response (FIR) filters) to remove the copy of the baseband signal at twice the intermediate frequency (IF) that was generated by the digital downconversion at multipliers 205 and 210. Lowpass filters 215 and 220 can be any combination of FIR lowpass filters, infinite impulse response (IIR) lowpass filters, or any other type of lowpass filter appropriate to remove the copy of the baseband signal at twice IF.

The resulting baseband signal from the signal channel, $x_1$ 225, can be represented as $$x_1 = s*h_1 + (i*+p**g)*h_2 + n_1 \quad (1)$$

and the resulting baseband signal from the image channel, $x_2$ 230, can be represented as $$x_2 = (i^* + p^{**}g)^*h_3 + s^*h_4 + n_2, \quad (2)$$

where:
All the quantities in equations (1) and (2) are functions of time, although for clarity the notation is not shown;
s[n] and i[n] denote the desired signal and image components, respectively;
p[n] denotes the digital leakage tracing sequence 180;
$n_1$[n] and $n_2$[n] denote noise components;
$h_1$[n] and $h_2$[n] denote the overall signal channel system responses to the components in the signal band and image band, respectively (these quantities include all the effects from the mixers in the quadrature downconverters, the polyphase filters, and the digital FIR filters);
$h_3$[n] and $h_4$[n] denote the overall image channel system responses to the components in the image band and signal band, respectively (these quantities include all the effects from the mixers in the quadrature downconverters, the polyphase filters, and the digital FIR filters); and
g[n] represents the linear distortion that the digital leakage tracing sequence, p[n] 180, experiences due to DAC 185 and upconverter 195.

Figure 3F:
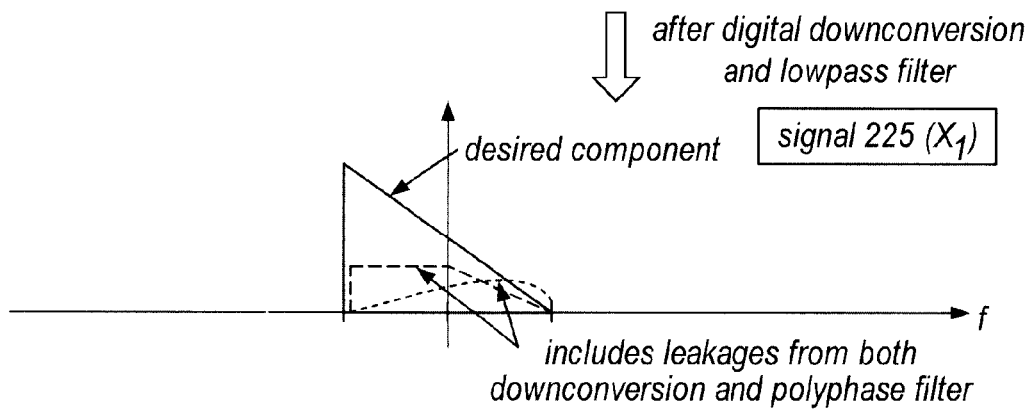
Figure 3G:
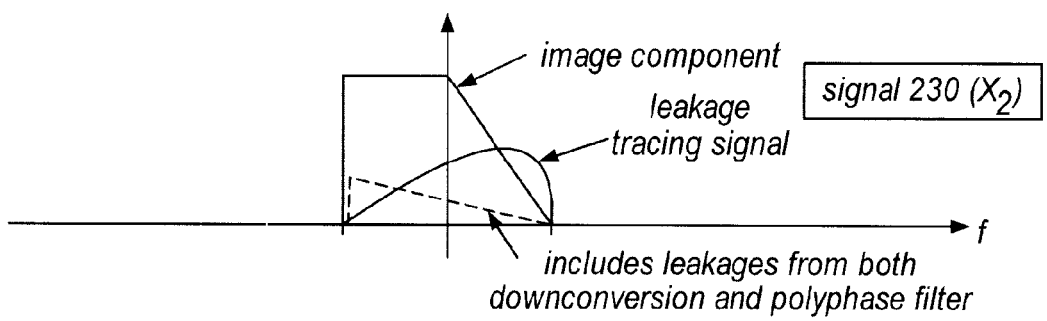
Figure 3I:
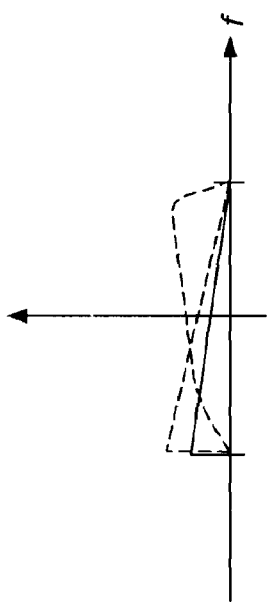

FIGS. 3F-3G are representations of the signals $x_1$ 225 and $x_2$ 230, respectively, in the frequency domain.

$x_1$[n] 225 can be used as the desired response for the least-mean-square (LMS) filter update component 235, and p*[n] 290 (the digital sequence of the leakage tracing signal) can be used as the input sequence for the LMS filter update component 235. Let $w_1$ denote the adaptive digital FIR filter with tap number, L, selected to be greater than the span of the quantity g[n]*$h_2$[n]. The standard LMS filter update is given by $$\vec{w}_{1,n} = \vec{w}_{1,n-1} + \mu(x_1[n] - \vec{w}_{1,n-1}^H \vec{p}_{n-1})^* \vec{p}_{n-1} \quad (3)$$

where the vector $p_{n-1}$ is formed by $[p[n], p[n-1], p[n-L+1]]^T$. Based on adaptive filtering theory, filter $w_1$ can be shown to converge to g[n]*$h_2$[n].

$$x_1 = s*h_1 + (i^* + p^**g)*h_2 + n_1 \left.\begin{array}{c}\text{Estimate}\\\xrightarrow{\phantom{xxx}} g*h_2\\p^*\end{array}\right\} \quad (4)$$

The LMS filter update component 235 outputs its filter estimate $w_n$ to the variable filter 245.

Similarly, $x_2$[n] 230 and p*[n] 290 can be used in a LMS filter update component 240 to estimate the quantity g[n]*$h_3$[n].

$$\vec{w}_{2,n} = \vec{w}_{2,n-1} + \mu(x_2[n] - \vec{w}_{2,n-1}^H \vec{p}_{n-1})^* \vec{p}_{n-1} \quad (5)$$

Using this update equation, filter $w_2$ can be shown to converge to g[n]*$h_3$[n].

$$x_2 = (i^* + p^**g)*h_3 + s*h_4 + n_2 \left.\begin{array}{c}\text{Estimate}\\\xrightarrow{\phantom{xxx}} g*h_3\\p^*\end{array}\right\} \quad (6)$$

Filter update component 240 outputs w2 to the variable filter 250.

Using the above LMS filter updates, slow variations of the impulse responses can be tracked, e.g., electronic component value variations caused by temperature fluctuation. Because of the properties of the LMS algorithm, the above implementations can avoid stability problems and can be guaranteed to converge to the optimum solution.

The signals $x_1$[n] 225 and $x_2$[n] 230 can be run through the filters 250 and 245 and the results subtracted. Thus, $x_1$[n] 225 can be filtered through variable filter 250 to generate a filtered signal 260 (depicted in the frequency domain in FIG. 3H). $x_2$[n] 230 can be filtered through variable filter 245 to generate a filtered signal 255 (depicted in the frequency domain in FIG. 3I). The subtraction of filtered signal 255 from filtered signal 260 can result in the cancellation of the image component and leakage tracing signal component:

$$w_2*x_1 - w_1*x_2 = g*h_3*x_1 - g*h_2*x_2 = \quad (7)$$
$$(g*h_3*h_1 - g*h_2*h_4)*s + g*h_3*n_1 - g*h_2*n_2$$

Figure 3J:
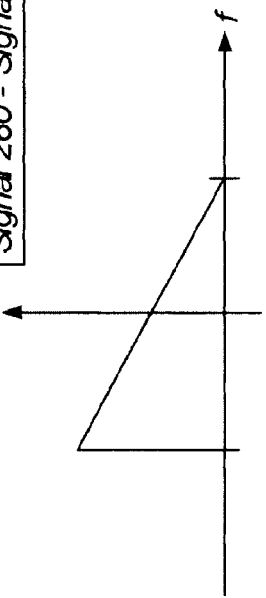
Figure 3H:
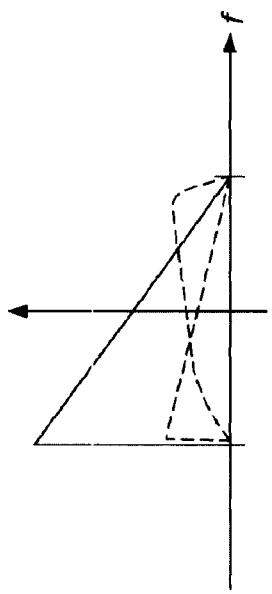

FIG. 3J depicts the resulting signal in the frequency domain.

In the present systems and techniques, because a known sequence is introduced into the image band, the signal leakage problem can be avoided by canceling the image in $x_1$[n] 225 using $x_2$[n] 230 as a reference. Near-perfect image rejection can be achieved; both the residue leakage tracing component and the image component from the analog suppression can be further canceled out in the DSP algorithm described above. The unknown linear distortion g[n] need not affect the performance of the image cancellation.

Moreover, both $h_3$[n] and $h_1$[n] can be close to or equal to a unitary pulse, and both $h_2$[n] and $h_4$[n] can be close to zero. Accordingly, significant distortion and attenuation of the signal component s[n] and enhancement of noise can be prevented. In some implementations, significant distortions are considered to be those greater than 3 dB. The signal-to-noise ratio need not be compromised when the image and leakage tracing components are canceled.

Furthermore, in the present systems and techniques, design of the analog components can be simplified because, for example, exact matches between the signal channel polyphase filter 135 and the image channel polyphase filter 140, and between mixers in the quadrature-downconverter 120, may not be necessary.

Figure 4:
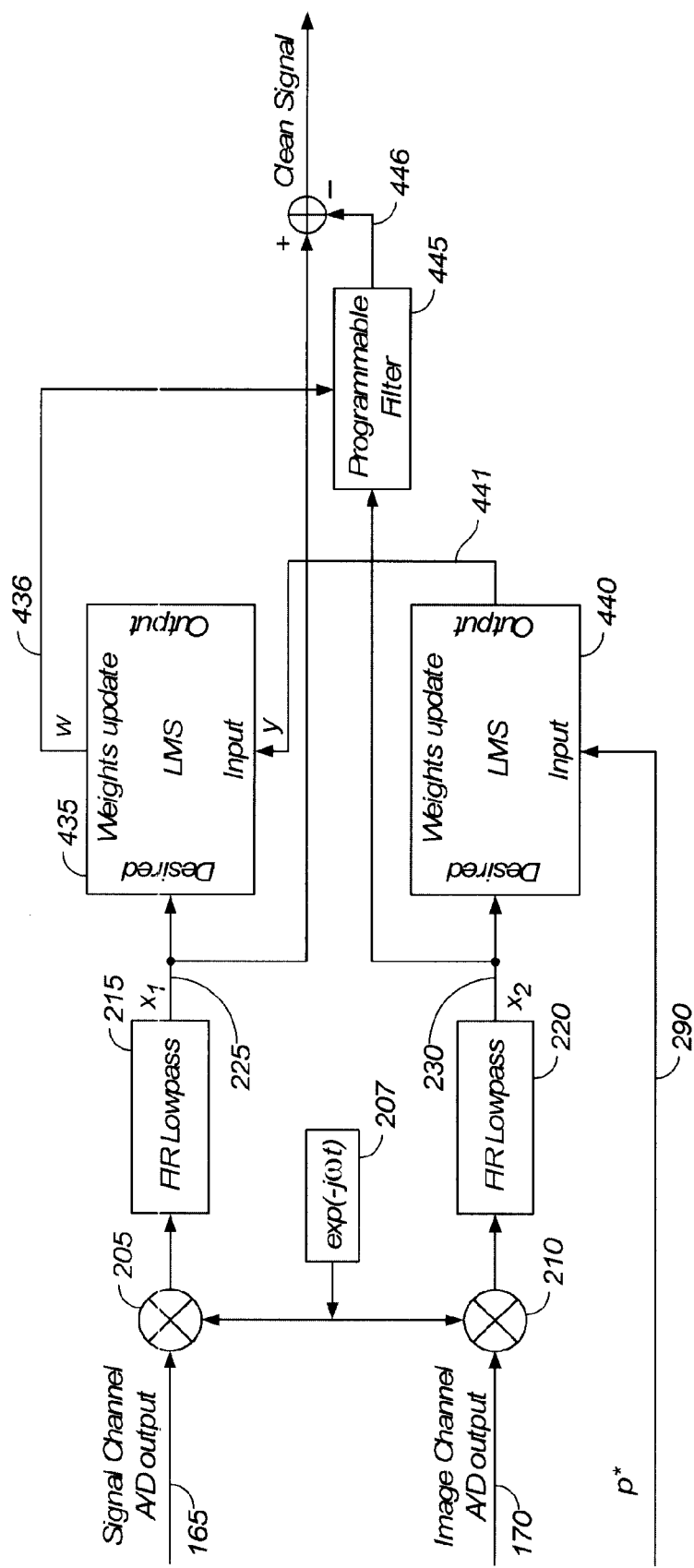

FIG. 4 depicts an implementation of a DSP including image cancellation. The components 205-220 can be the same as those discussed above in connection with FIG. 2. The signal $x_1$ 225, the output of lowpass filter 215, can be represented as $$x_1 = s*h_1 + (i^* + p^{**}g)*h_2 \quad (8)$$

and the signal $x_2$ 230, the output of lowpass filter 220, can be represented as $$x_2 = (i^* + p^{**}g)*h_3 + s*h_4 \quad (9)$$

where:
All the quantities in equations (8) and (9) are functions of time;
s[n] and i[n] denote the signal and image components;
p[n] denotes digital leakage tracing sequence 180;
$h_1$[n] denotes the overall signal channel system response (including quadrature downconverter 120 and signal channel polyphase filter 135) to the components in the signal band;
$h_2$[n] denotes the overall signal channel system response (including quadrature downconverter 120 and signal channel polyphase filter 135) to the components in the image band;

h₃[n] denotes the overall image channel system response (including quadrature downconverter 120 and image channel polyphase filter 140) to the components in the image band;

h₄[n] denotes the overall image channel system response (including quadrature downconverter 120 and image channel polyphase filter 140) to the components in the signal band;

h₁[n] and h₃[n] are close to ideal impulse;

h₂[n] and h₄[n] are cross-channel leakage terms and have much smaller magnitudes compared to h₁[n] and h₃[n].

g[n] represents the linear distortion that leakage tracing sequence 180 experiences during due to DAC 185 and upconverter 195.

x₂[n] 230 can be used as the desired response for LMS filter update component 440, and p*[n] 290 can be used as the input sequence for LMS block 440. The adaptive filter (in this implementation, LMS block 440) converges to g[n]*h₃[n], and the output 441 of the LMS block 440, denoted by y[n], is the filtered version of the input p*[n]:

$$y = g * h_3 * p^* \tag{10}$$

After LMS block 440 converges, LMS block 435 can adapt. The filter coefficients of LMS block 435, w 436, can be represented as:

$$w = h_2 * h_3^{-1} \tag{11}$$

This denotes a filter generated by deconvolving h₂[n] with h₃[n], i.e., $$w * h_3 = h_2 \tag{12}$$

Because h₃[n] and g[n] can be very close to ideal impulse, i.e., they do not have zeros and can have nearly flat amplitude responses in the frequency domain, their inverses can exist and can only last for very few taps.

Filter coefficients w 436 can be passed to programmable filter 445. The output 446 of the filter 445 can be represented as:

$$h_2 * h_3^{-1} * x_2 = g * h_2 * p^* + h_2 * i^* + h_3^{-1} * h_2 * h_4 * s \tag{13}$$

The image leakage can be removed by subtracting programmable filter output 446 from x₁[n] 225:

$$x_1 - h_2 * h_3^{-1} * x_2 = (h_1 + h_3^{-1} * h_2 * h_4) * s \tag{14}$$

Features of implementations described earlier can also be present in the implementation just described. For example, slow variations of the impulse responses can be tracked, e.g., electronic component value variations caused by temperature fluctuation. Also, because of the properties of the LMS algorithm, the above implementations can avoid stability problems and can be guaranteed to converge to the optimum solution.

Figure 5:
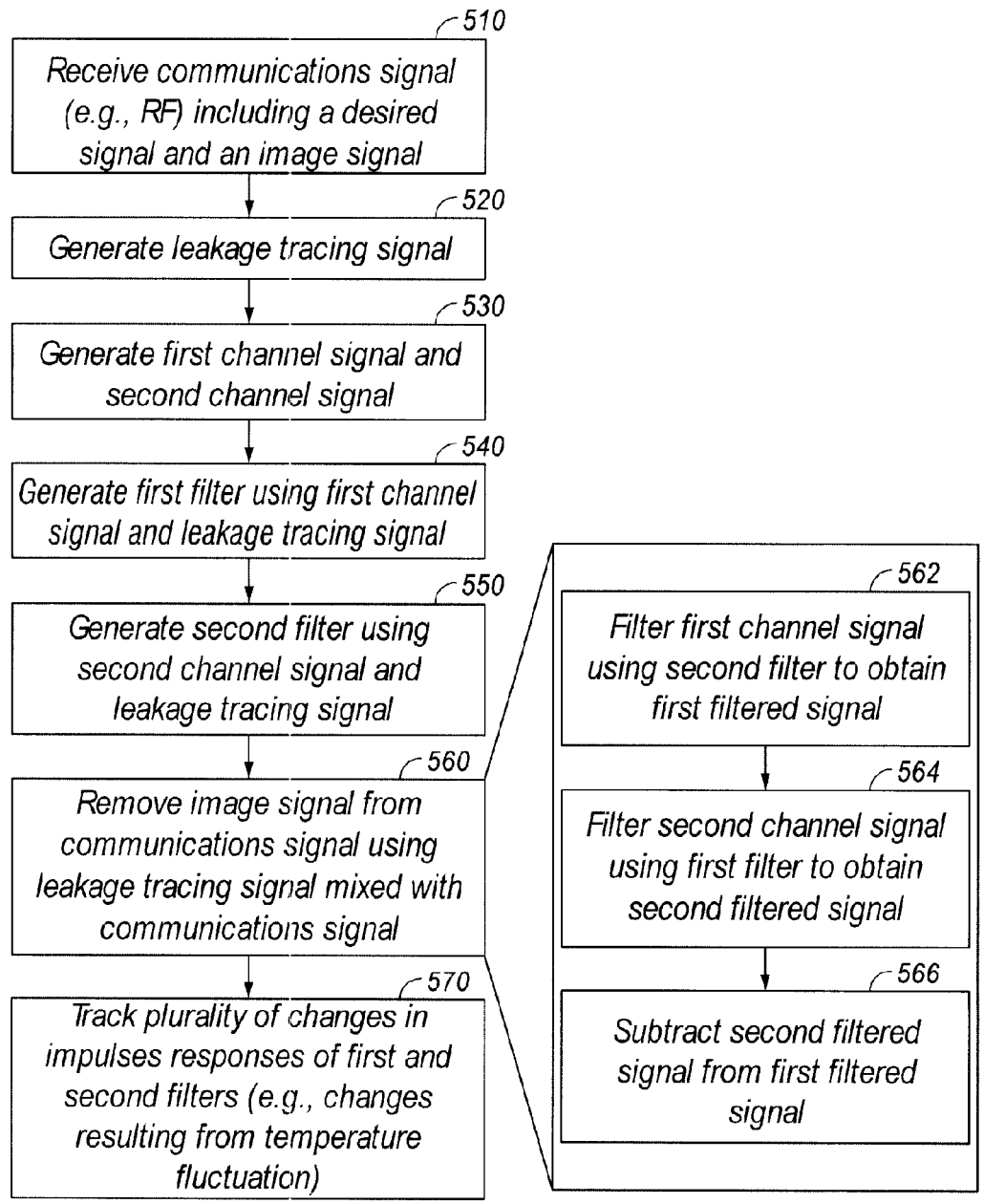
FIG. 5 shows a process for image cancellation.

FIG. 5 shows a process for image cancellation. At 510, a communications signal is received that includes a desired component in the signal band and an interfering component in the image band (e.g., by receiver 100). In an implementation, the communications signal can be a radio-frequency (RF) signal. At 520, a leakage tracing signal (e.g., leakage tracing signal 196, a pseudonoise signal, a binary phase-shift keying (BPSK) modulated M-sequence) can be generated (e.g., by DSP 175) and injected into the image band at the receiver front end before the quadrature downconverter (e.g., quadrature downconverter 120). At 530, the signal channel processed intermediate-frequency (IF) signal (e.g., digitized filtered signal 165)—which includes the desired component, as well as the interfering and the leakage tracing signals leaked from the image band—can be generated using an analog-to-digital converter (ADC) (e.g., ADC 155). Also at 530, the image channel processed IF signal (e.g., digitized filtered signal 170)—which includes the image band components and the desired component leaked from the signal band—can be generated using another ADC (e.g., ADC 160).

At 540 and 550, the leakage from the image band components to the signal channel processed IF signal and the transfer function from the image band components to the image channel processed IF signal can be identified in terms of two impulse responses by correlating the two received IF signals (e.g., digitized filtered signals 165 and 170) with the known leakage tracing signal (e.g., using DSP 175).

A first filter (e.g., variable filter 245 and/or LMS filter update component 235) and a second filter (e.g, variable filter 250 and/or LMS filter update component 240) can thus be identified, and with these two filters, both the interfering and the leakage tracing components that leaked into the signal channel IF signal can be removed at 560 (e.g., by DSP 175). This removal can include: filtering the signal channel processed IF signal using the second filter to obtain a first filtered signal (562) (e.g., filtered signal 260); filtering the image channel processed IF signal using the first filter to obtain a second filtered signal (564) (e.g., filtered signal 255); and subtracting the second filtered signal from the first filtered signal (566).

Changes in the impulse responses of the first and second filters can be tracked at 570. Such changes can occur, for example, as a result of temperature fluctuations.

Some implementations need not perform all of the operations depicted in FIG. 5. For example, in an implementation, a communications signal having a desired signal and an interfering component is received at 510, a leakage tracing signal is generated at 520, and the interfering component is removed from the communications signal using the leakage tracing signal mixed with the communications signal at 560.

Figure 6B:
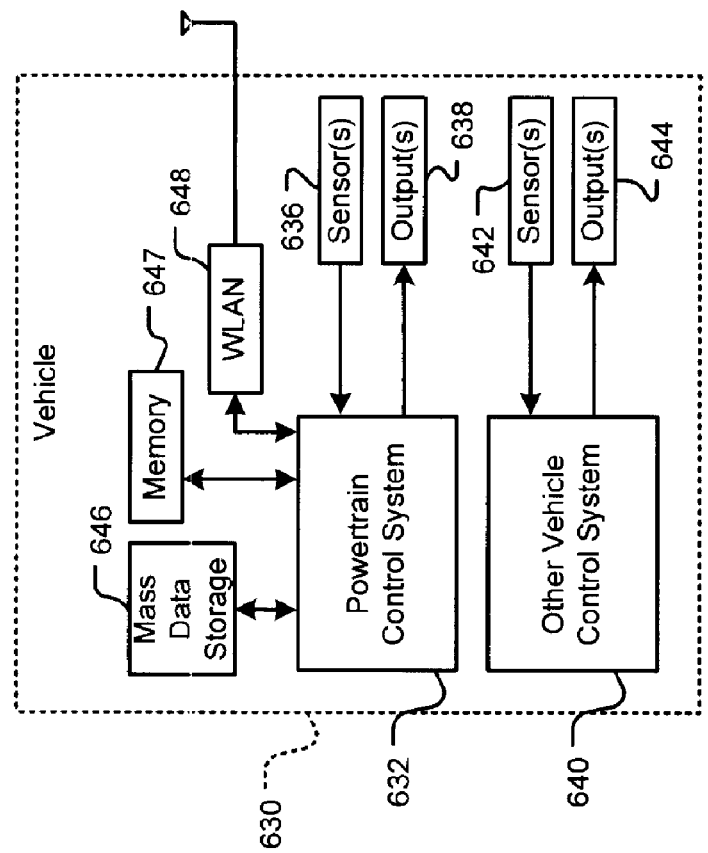
FIGS. 6A-6E show various exemplary implementations of the described systems and techniques.
Figure 6A:
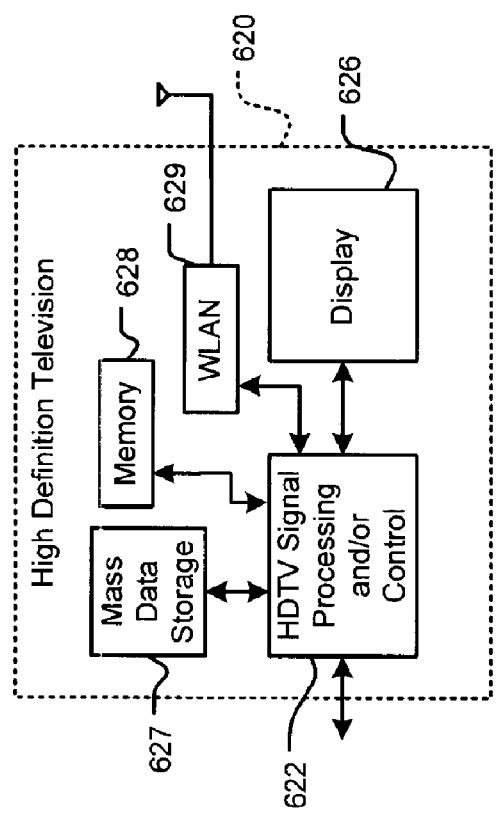

FIGS. 6A-6E show various exemplary implementations of the described systems and techniques. Referring now to FIG. 6A, the described systems and techniques (e.g., associated with receiver 100) can be implemented in a high definition television (HDTV) 620. The described systems and techniques may be implemented in either or both signal processing and/or control circuits, which are generally identified in FIG. 6A at 622, a WLAN (wireless local area network) interface and/or mass data storage of the HDTV 620. The HDTV 620 receives HDTV input signals in either a wired or wireless format and generates HDTV output signals for a display 626. In some implementations, signal processing circuit and/or control circuit 622 and/or other circuits (not shown) of the HDTV 620 may process data, perform coding and/or encryption, perform calculations, format data and/or perform any other type of HDTV processing that may be required.

The HDTV 620 may communicate with mass data storage 627 that stores data in a nonvolatile manner such as optical and/or magnetic storage devices. The mass data storage 627 may be a hard disk drive (HDD), such as a mini HDD that includes one or more platters having a diameter that is smaller than approximately 1.8". The HDTV 620 may be connected to memory 628 such as random access memory (RAM), read only memory (ROM), low latency nonvolatile memory such as flash memory and/or other suitable electronic data storage. The HDTV 620 also may support connections with a WLAN via a WLAN network interface 629.

Referring now to FIG. 6B, the described systems and techniques implement a control system of a vehicle 630, a WLAN interface and/or mass data storage of the vehicle control system. In some implementations, the described systems and techniques implement a powertrain control system 632 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The described systems and techniques may also be implemented in other control systems 640 of the vehicle 630. The control system 640 may likewise receive signals from input sensors 642 and/or output control signals to one or more output devices 644. In some implementations, the control system 640 may be part of an anti-lock braking system (ABS), a navigation system, a telematics system, a vehicle telematics system, a lane departure system, an adaptive cruise control system, a vehicle entertainment system such as a stereo, digital versatile disc (DVD), compact disc and the like. Still other implementations are contemplated.

The powertrain control system 632 may communicate with mass data storage 646 that stores data in a nonvolatile manner. The mass data storage 646 may include optical and/or magnetic storage devices for example hard disk drives HDD and/or DVDs. The HDD may be a mini HDD that includes one or more platters having a diameter that is smaller than approximately 1.8". The powertrain control system 632 may be connected to memory 647 such as RAM, ROM, low latency nonvolatile memory such as flash memory and/or other suitable electronic data storage. The powertrain control system 632 also may support connections with a WLAN via a WLAN network interface 648. The control system 640 may also include mass data storage, memory and/or a WLAN interface (all not shown).

Figure 6C:
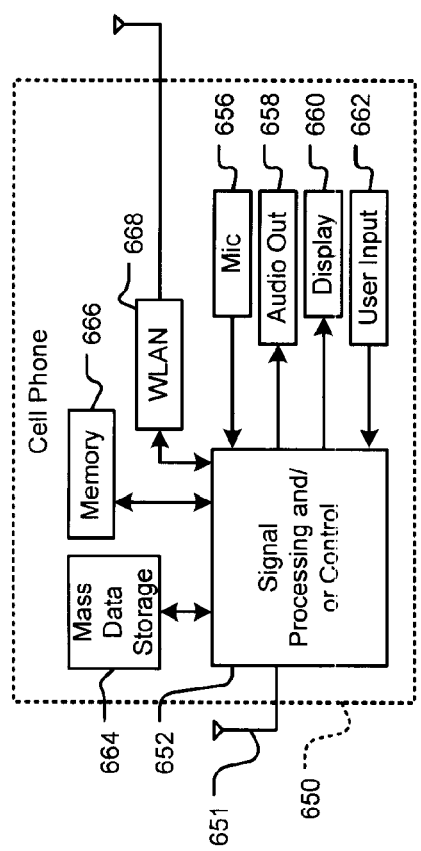

Referring now to FIG. 6C, the described systems and techniques can be implemented in a cellular phone 650 that may include a cellular antenna 651. The described systems and techniques may be implemented in either or both signal processing and/or control circuits, which are generally identified in FIG. 9E at 652, a WLAN interface and/or mass data storage of the cellular phone 650. In some implementations, the cellular phone 650 includes a microphone 656, an audio output 658 such as a speaker and/or audio output jack, a display 660 and/or an input device 662 such as a keypad, pointing device, voice actuation and/or other input device. The signal processing and/or control circuits 652 and/or other circuits (not shown) in the cellular phone 650 may process data, perform coding and/or encryption, perform calculations, format data and/or perform other cellular phone functions.

The cellular phone 650 may communicate with mass data storage 664 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 650 may be connected to memory 666 such as RAM, ROM, low latency nonvolatile memory such as flash memory and/or other suitable electronic data storage. The cellular phone 650 also may support connections with a WLAN via a WLAN network interface 668.

Figure 6D:
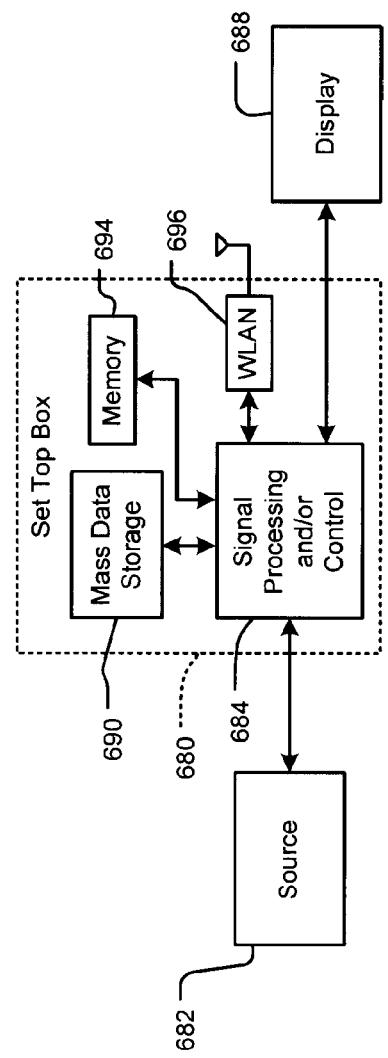
Figure 6E:
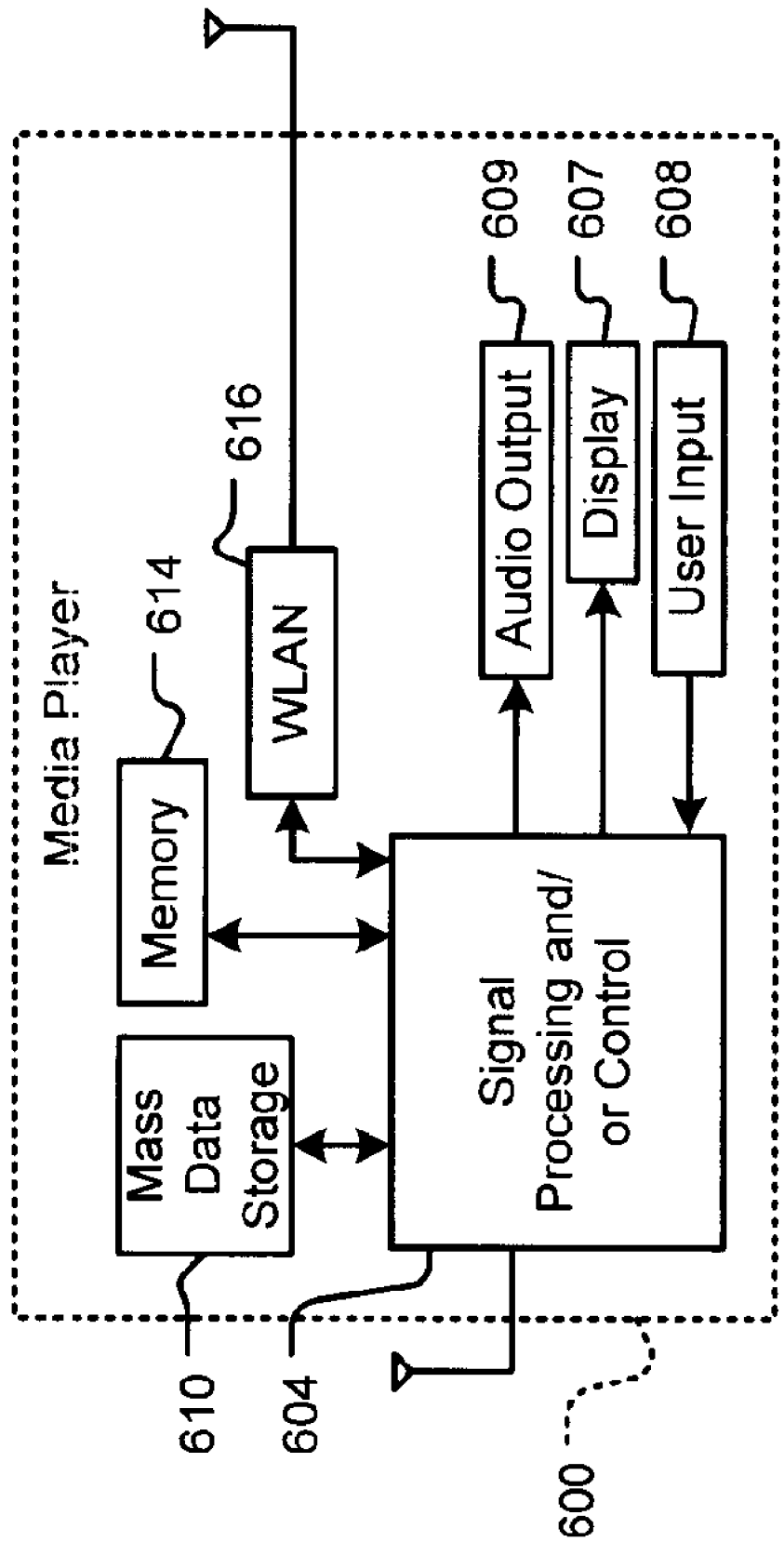

Referring now to FIG. 6D, the described systems and techniques can be implemented in a set top box 680. The described systems and techniques may be implemented in either or both signal processing and/or control circuits, which are generally identified in FIG. 6D at 684, a WLAN interface and/or mass data storage of the set top box 680. The set top box 680 receives signals from a source 682 such as a broadband source and outputs standard and/or high definition audio/video signals suitable for a display 688 such as a television and/or monitor and/or other video and/or audio output devices. The signal processing and/or control circuits 684 and/or other circuits (not shown) of the set top box 680 may process data, perform coding and/or encryption, perform calculations, format data and/or perform any other set top box function.

The set top box 680 may communicate with mass data storage 690 that stores data in a nonvolatile manner. The mass data storage 690 may include optical and/or magnetic storage devices for example hard disk drives HDD and/or DVDs. The HDD may be a mini HDD that includes one or more platters having a diameter that is smaller than approximately 1.8". The set top box 680 may be connected to memory 694 such as RAM, ROM, low latency nonvolatile memory such as flash memory and/or other suitable electronic data storage. The set top box 680 also may support connections with a WLAN via a WLAN network interface 696.

Referring now to FIG. 6D, the described systems and techniques can be implemented in a media player 600. The described systems and techniques may be implemented in either or both signal processing and/or control circuits, which are generally identified in FIG. 6E at 604, a WLAN interface and/or mass data storage of the media player 600. In some implementations, the media player 600 includes a display 607 and/or a user input 608 such as a keypad, touchpad and the like. In some implementations, the media player 600 may employ a graphical user interface (GUI) that typically employs menus, drop down menus, icons and/or a point-and-click interface via the display 607 and/or user input 608. The media player 600 further includes an audio output 609 such as a speaker and/or audio output jack. The signal processing and/or control circuits 604 and/or other circuits (not shown) of the media player 600 may process data, perform coding and/or encryption, perform calculations, format data and/or perform any other media player function.

The media player 600 may communicate with mass data storage 610 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 600 may be connected to memory 614 such as RAM, ROM, low latency nonvolatile memory such as flash memory and/or other suitable electronic data storage. The media player 600 also may support connections with a WLAN via a WLAN network interface 616. Still other implementations in addition to those described above are contemplated.

A number of implementations have been described. Nevertheless, it will be understood that various modifications can be made without departing from the spirit and scope of the disclosure. For example, one or more of the filters described above can be embodied in a number of different ways. A filter may be embodied as part of an integrated circuit on a single piece of silicon, where one or many circuits can be formed on a single silicon substrate, and other digital components used for the communication can also be formed on the substrate. In addition, however, a filter can be embodied as discrete components, e.g., defined using hardware definition language, or by a suitably programmed digital signal processor, or in software executed by a general purpose processor. The processor can filter the signal according to the filter's transfer function. The processor can also be configured to simulate the results of the filter, e.g., as part of a simulation program such as MATLAB™.

In addition, other modifications are possible. For example, it should be understood that the described systems and techniques can analogously be used for other kinds of noise rejection. Moreover, while portions of the implementations have been described as being done in the digital domain, it should be understood that these portions could also be implemented in the analog domain. Also, various operations depicted in a flowchart can be skipped or performed out of order and still provide desirable results. Accordingly, all such modifications and other embodiments and implementations are within the scope of the following claims.

What is claimed is:

1. A method comprising:
receiving a communications signal comprising a desired signal and an image signal;
generating a leakage tracing signal at a frequency band of the image signal, the leakage tracing signal comprising a noise signal, wherein a frequency of the leakage tracing signal is within the frequency band of the image signal;
removing the image signal from a signal that is based on the communications signal and the leakage tracing signal to resolve the desired signal, wherein the removing is based on an addition of the leakage tracing signal to the communications signal, and the removing comprises using one or more weights to control one or more filters to resolve the desired signal, wherein the one or more weights are determined based on the noise signal.

2. The method of claim 1, wherein removing the image signal comprises:
updating the one or more weights based on the noise signal and one or more previous versions of the one or more weights.

3. The method of claim 1, further comprising:
receiving a first signal comprising the desired signal and a component of the image signal; and
receiving a second signal comprising the image signal and a component of the desired signal,
wherein the removing the image signal comprises subtracting a modified version of the second signal from the first signal.

4. The method of claim 3, further comprising:
filtering the second signal, based on the leakage tracing signal and the first signal, to generate the modified version of the second signal; and
filtering the first signal, based on the leakage tracing signal and the second signal, to generate a modified version of the first signal,
wherein the subtracting comprises subtracting the modified version of the second signal from the modified version of the first signal.

5. The method of claim 4, wherein the filtering the second signal comprises determining first least-mean-square update weights based on the first signal and the leakage tracing signal, and adaptively filtering the second signal based on the first least-mean-square update weights; and
wherein the filtering the first signal comprises determining second least-mean-square update weights based on the second signal and the leakage tracing signal, and adaptively filtering the first signal based on the second least-mean-square update weights,
wherein the one or more weights comprise the first least-mean-square update weights and the second least-mean-square update weights.

6. The method of claim 3, further comprising:
filtering the second signal, based on the leakage tracing signal and the first signal, to generate the modified version of the second signal,
wherein the filtering the second signal comprises:
determining first least-mean-square update weights based on the second signal and the leakage tracing signal;
determining second least-mean-square update weights based on the first signal and the first least-mean-square update weights; and
programmably filtering the second signal based on the second least-mean-square update weights, wherein the one or more weights comprise the second least-mean-square update weights.

7. The method of claim 1, further comprising:
adding the leakage tracing signal to the communications signal to produce a combined signal;
downconverting the combined signal to form a downconverted signal; and
filtering the downconverted signal in both a signal channel and an image channel.

8. The method of claim 7, wherein the downconverting comprises downconverting the combined signal to form in-phase and quadrature signals,
wherein the filtering the downconverted signal comprises:
polyphase filtering the in-phase signal and the quadrature signal in the signal channel; and
polyphase filtering the in-phase signal and an inverted version of the quadrature signal in the image channel.

9. The method of claim 1, wherein the generating the leakage tracing signal comprises upconverting the noise signal to the frequency band of the image signal, wherein the communications signal comprises one or more digital television signals.

10. An apparatus, comprising:
circuitry configured to receive a communications signal comprising a desired signal and an image signal;
circuitry configured to generate a leakage tracing signal at a frequency band of the image signal, the leakage tracing signal comprising a noise signal, wherein a frequency of the leakage tracing signal is within the frequency band of the image signal; and
circuitry to remove, based on an addition of the leakage tracing signal to the communications signal, the image signal from a signal which is responsive to the communications signal and the leakage tracing signal to resolve the desired signal, wherein the circuitry to remove the image signal comprises one or more filters that are controlled by one or more weights, wherein the one or more weights are determined based on the noise signal.

11. The apparatus of claim 10, further comprising:
circuitry configured to update the one or more weights based on the noise signal and one or more previous versions of the one or more weights.

12. The apparatus of claim 10, further comprising:
an adder to add the leakage tracing signal to the communications signal, wherein the communications signal comprises one or more digital television signals.

13. The apparatus of claim 10, further comprising:
a quadrature downconverter configured to generate a first channel signal and a second channel signal from the communications signal;
a first filter configured to filter the second channel signal, based on the first channel signal and the noise signal, and to output a first filtered signal, wherein the one or more filters comprise the first filter;
a second filter configured to filter the first channel signal, based on the second channel signal and the noise signal, and to output a second filtered signal, wherein the one or more filters comprise the second filter; and an adder configured to subtract the first filtered signal from the second filtered signal.

14. The apparatus of claim 13, wherein the first and second filters comprise adaptive filters; wherein the first filter comprises a first least-mean-squared filter; and wherein the second filter comprises a second least-mean-squared filter.

15. The apparatus of claim 10, further comprising:
a quadrature downconverter configured to generate a first channel signal and a second channel signal from the communications signal;
a first adaptive filter responsive to the first channel signal;
a second adaptive filter responsive to the noise signal and the second channel signal, wherein the first adaptive filter is further responsive to an output of the second adaptive filter;
a third filter responsive to the second channel signal and an output of the first adaptive filter, wherein the one or more filters comprise the third filter; and
an adder configured to subtract an output of the third filter from the first channel signal.

16. A system comprising:
circuitry configured to receive a communications signal comprising a desired signal and an image signal;
a device configured to (i) generate a leakage tracing signal at a frequency band of the image signal based on a noise signal and to (ii) remove, based on an addition of the leakage tracing signal to the communications signal, the image signal from a signal which is responsive to the communications signal and the leakage tracing signal to resolve the desired signal, wherein a frequency of the leakage tracing signal is within the frequency band of the image signal, wherein the device is configured to use one or more weights to control one or more filters to resolve the desired signal, wherein the one or more weights are determined based on the noise signal; and
an adder to add the leakage tracing signal to the communications signal.

17. The system of claim 16, wherein the device is configured to update the one or more weights based on the noise signal and one or more previous versions of the one or more weights.

18. The system of claim 16, further comprising:
a quadrature downconverter configured to generate a first channel signal and a second channel signal based on an output of the adder,
wherein the device comprises:
a first filter configured to filter the second channel signal, based on the first channel signal and the noise signal, and to output a first filtered signal, wherein the one or more filters comprise the first filter;
a second filter configured to filter the first channel signal, based on the second channel signal and the noise signal, and to output a second filtered signal, wherein the one or more filters comprise the second filter; and
an adder configured to subtract the first filtered signal from the second filtered signal.

19. The system of claim 16, further comprising:
a quadrature downconverter configured to generate a first channel signal and a second channel signal based on an output of the adder,
wherein the device comprises:
a first adaptive filter responsive to the first channel signal;
a second adaptive filter responsive to the noise signal and the second channel signal, wherein the first adaptive filter is further responsive to an output of the second adaptive filter;
a third filter responsive to the second channel signal and an output of the first adaptive filter, wherein the one or more filters comprise the third filter; and
an adder configured to subtract an output of the third filter from the first channel signal.

20. The system of claim 16, wherein the communications signal comprises one or more digital television signals.

* * * * *